United States Patent Office 3,050,550
Patented Aug. 21, 1962

3,050,550
NOVEL PROCESS FOR THE PREPARATION OF CYCLOPENTANO - OCTAHYDRONAPHTHALENE DERIVATIVES AND PRODUCTS OBTAINED IN THIS PROCESS
Gerard Nominé, Noisy-le-Sec, and Daniel Bertin, Montrouge, France, assignors, by mesne assignments, to Roussel-UCLAF, S.A., Paris, France, a corporation of France
No Drawing. Filed Sept. 21, 1960, Ser. No. 57,412
Claims priority, application France, Oct. 15, 1959
8 Claims. (Cl. 260—476)

The present invention relates to a novel process for the preparation of cyclopentano-octahydronaphthalene derivatives and the intermediate products obtained from this process, particularly to $\Delta^{8(9)}$-3-methyl-7-oxo-8-(3'-chloro-2'-butenyl) - 3,4 - [3' - acyloxy - cyclopentano - (2',1')] - octahydronaphthalene compounds, of the Formula II:

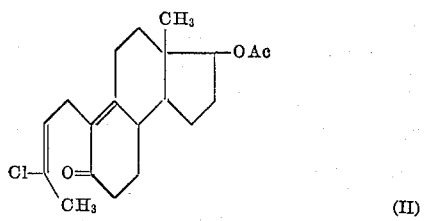

(II)

wherein Ac represents the acyl radical of an organic carboxylic acid having from 1 to 18 carbon atoms.

In copending, commonly assigned U.S. patent application Serial No. 36,171, filed June 15, 1960, now Patent No. 3,019,252, there is described a process for the preparation of $\Delta^{8(9)}$-3-methyl-7-oxo-8-(3'-oxobutyl)-3,4-[3'-acyloxy-cyclopentano-(2',1')]-octahydronaphthalene compounds, of the Formula III:

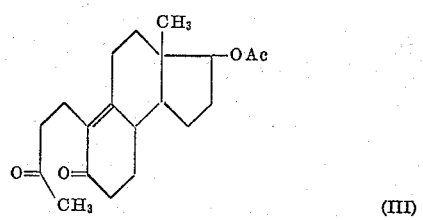

(III)

wherein Ac represents the acyl radical of an organic carboxylic acid having from 1 to 18 carbon atoms, by hydrolysis with an aqueous hydrolyzing agent such as concentrated sulfuric acid, of the corresponding $\Delta^{9(10)}$-3-methyl - 7 - oxo - 8 - (3' - chloro - 2' - butenyl) - 3,4 - [3' - acyloxy - cyclopentano - (2',1')] - octahydronaphthalene compounds, resulting from a condensation of $\Delta^{9(10)}$ - 3 - methyl - 7 - oxo - 3,4 - [3' - acyloxy - cyclopentano-(2',1')]-octahydronaphthalene with 1,3-dichloro-2-butene. This hydrolysis, which results in the creation of a ketone function on the side chain and at the same time allows the migration of the double bond from the 9–10 position into the 8–9 position, itself produced only very mediocre yields of below 40%.

The cyclopentanonaphthalene derivatives, so produced, are intermediate products used for the synthesis of steroids and analogous compounds. Thus, after reduction of the 8(9)-ethylene bond, by intramolecular condensation between the carbonyl in the 7-position and the terminal methyl group of the side chain, it is possible to obtain different esters of 19-nortestosterone. Estradiol can also be produced from this intermediate.

It is an object of this invention to produce $\Delta^{8(9)}$-3-methyl - 7 - oxo - 8 - (3' - oxobutyl) - 3,4 - [3' - acyloxy - cyclopentano-(2',1')]-octahydronaphthalene compounds of the Formula III:

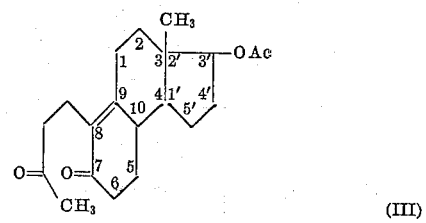

(III)

wherein Ac represents the acyl radical of an organic carboxylic acid having from 1 to 18 carbon atoms, in improved yields by a two-step process of first isomerizing and thereafter hydrolyzing the starting $\Delta^{9(10)}$-chlorinated compound.

A further object of the invention is the production of the intermediate $\Delta^{8(9)}$-3-methyl-7-oxo-8-(3'-chloro-2'-butenyl) - 3,4 - [3' - acyloxy - cyclopentano (2',1')] - octahydronaphthalene compounds having the structural formula:

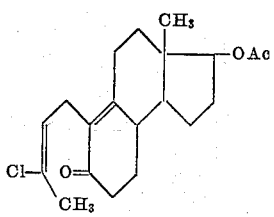

where Ac represents an acyl radical of an organic carboxylic acid having from 1 to 18 carbon atoms.

These and other objects of the invention will become more apparent as the description thereof proceeds.

Now it has been found, and this was totally unexpected, that if the passage of the $\Delta^{9(10)}$-3-methyl-7-oxo-8-(3' - chloro - 2' - butenyl) - 3,4 - [3' - acyloxy - cyclopentano-(2',1')]-octahydronaphthalene compounds of Formula I into the $\Delta^{8(9)}$-3-methyl-7-oxo-8-(3'-oxobutyl)-3,4 - [3' - acyloxy - cyclopentano - (2',1')] - octahydronaphthalene compounds of Formula III is effected in two steps, that is to say if first an isomerization of $\Delta^{9(10)}$-3-methyl - 7 -oxo - 8 - (3' - chloro - 2' - butenyl) - 3,4 - [3' - acyloxy-cyclopentano-(2',1')]-octahydronaphthalene compounds of Formula I into $\Delta^{8(9)}$-3-methyl-7-oxo-8-(3'-chloro - 2' - butenyl) - 3,4 - [3' - acyloxy -cyclopentano - (2',1')]-octahydronaphthalene compounds of Formula II is effected and then the latter is subjected to acid hydrolysis to obtain the desired $\Delta^{8(9)}$-3-methyl-7-oxo-8-(3'-oxobutyl) - 3,4 - [3' - acyloxy - cyclopentano - (2',1')]-octahydronaphthalene compounds of Formula III, the overall yield of this method of operation is far superior to that of the original process and yields of over 60% and as high as 80% or higher are easily attained.

The process, which is the object of the invention, consists then essentially of isomerizing the $\Delta^{9(10)}$-3-methyl-7-oxo - 8 - (3' - chloro - 2' - butenyl) - 3,4 - [3' - acyloxy - cyclopentano-(2',1')]-octahydronaphthalene compounds, of the Formula I, dissolved in an inert organic solvent such as ether, by means of anhydrous, non-hydrolyzing acidic agents, such as especially anhydrous hydrochloric acid in an inert organic solvent at room temperature, and subjecting $\Delta^{8(9)}$-3-methyl-7-oxo-8-(3'-chloro-2'-butenyl)-3,4 - [3' - acyloxy - cyclopentano - (2',1')] octahydronaphthalene compounds of Formula II, resulting, to the action of hydrolyzing agents, as for example, concentrated sulfuric acid. It is preferred to use a concentrated aqueous solution of a strong mineral acid such as concentrated sulfuric acid. The reaction occurs at room temperature. Table I discloses the reaction scheme of the invention.

TABLE I

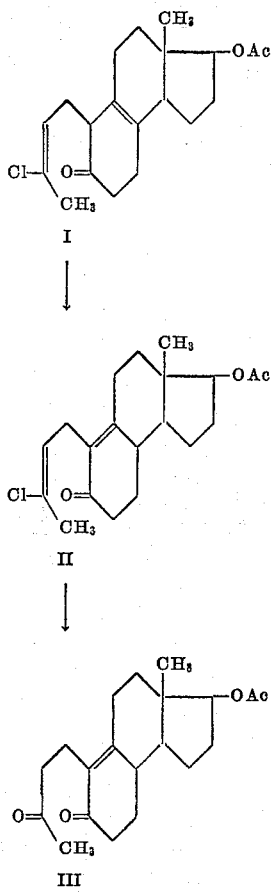

Ac=acyl radical of an organic carboxylic acid having from 1 to 18 carbon atoms.

The invention, it is well understood, covers the intermediate products obtained in the present process, namely the $\Delta^{8(9)}$ - 3 - methyl - 7 - oxo - 8 - (3' - chloro - 2'-butenyl) - 3,4 - [3' - acyloxy - cyclopentano - (2',1')]-octahydronaphthalene compounds of Formula II which are novel industrial products.

A preferred mode of execution of the process of the invention is to employ the benzoic acid ester of starting Compound I, but other esters of organic carboxylic acids having 1 to 18 carbon atoms such as the alkanoates and alkenoates, for example, the acetate, the trimethylacetate, the propionate, the 4,4-dimethyl-pentanoate, the 10-undecenoate; the cycloalkyl alkanoates, for example, the β-cyclopentylpropionate; the arylalkanoates, the phenylpropionate; the cycloalkanoates, the hexahydrobenzoate, the hexahydroterephthalate; and other phenylcarboxylic acids, the 3,5-dinitrobenzoate, may also be used without departing from the scope of the invention.

The following example illustrates the invention. It is, however, not to be construed as providing any limiting characteristics. The melting points are instantaneous melting points determined on a Maquenne block. The temperatures are indicated in degrees centigrade.

EXAMPLE

Preparation of $\Delta^{8(9)}$-3-Methyl-7-Oxo-8-(3'-Oxobutyl)-3, 4 - [3' - Benzoyloxy - Cyclopentano - (2',1')] - Octahydronaphthalene, III, $Ac = C_6H_5CO$ (a) *Isomerization.*—0.35 gm. of $\Delta^{9(10)}$-3-methyl-7-oxo-8 - (3' - chloro - 2' - butenyl) - 3,4 - [3' - benzoyloxy-cyclopentano-(2',1')]-octahydronaphthalene, I, $$Ac = C_6H_5CO$$

were dissolved in 70 cc. of anhydrous ether. Compound I was obtained by condensation of $\Delta^{9(10)}$-3-methyl-7-oxo-3,4[3' - benzoyloxy - cyclopentano - (2',1')] - octahydronaphthalene with 1,3-dichloro-2-butene in the presence of sodium t-amylate, as it has been described in the co-pending, commonly-assigned U.S. patent application Serial No. 36,171. 60 cc. of a solution of hydrochloric acid in ether containing 56 gm. of anhydrous pure hydrochloric acid per liter of ether were added to the ethereal solution of Compound I, and the reaction mixture was allowed to stand at room temperature for two and a half hours. Then, 50 cc. of a saturated solution of sodium bicarbonate was poured into the reaction mixture. The ethereal solution was decanted and washed with water, dried over sodium sulfate, then evaporated to dryness in vacuo. The residue was redissolved in 30 cc. of methylene chloride, subjected to chromatography over gm. of silicagel and eluted with methylene chloride containing 0.8% acetone. 0.30 gm. of a colorless resin was obtained, consisting of $\Delta^{8(9)}$-3-methyl-7-oxo-8(3'-chloro-2' - butenyl) - 3,4 - [3' - benzoyloxy - cyclopentano-(2',1')] - octahydronaphthalene, II, $Ac = C_6H_5CO$. Compound II was soluble in most of the customary organic solvents such as alcohol, ether, acetone, benzene and chloroform, and insoluble in water and dilute aqueous acids or alkalies.

The ultraviolet spectrum showed a maximum at 236 mμ, $$E^{1\%}_{1\,cm.} = 450$$

and another maximum at 250 mμ, $$E^{1\%}_{1\,cm.} = 303$$

This product is directly usable for the rest of the synthesis.

It is not described in the literature.

(b) *Hydrolysis.*—0.093 gm. of Compound II, $$Ac = C_6H_5CO$$

prepared as above, was triturated with 0.5 cc. of concentrated sulfuric acid. The mixture quickly became liquid and its color clear orange. After five minutes, it was poured into a mixture of water, sodium bicarbonate and ice. Then the mixture was extracted with two 5 cc. aliquots of methylene chloride. The extracts were combined, washed with water, then dried over sodium sulfate and evaporated to dryness in vacuo. A residue of 0.087 gm. consisting of $\Delta^{8(9)}$-3-methyl-7-oxo-8-(3'-oxobutyl) - 3,4 - [3' - benzoyloxy - cyclopentano - (2',1')]-octahydronaphthalene, III, $Ac = C_6H_5CO$ was obtained, which was recrystallized in ether to recover 0.065 gm. of a product melting at 98° C. This product, Compound III, was identical in all respects to the product obtained by the former process, described in Serial No. 36,171. Ultraviolet spectrum: maximum at 237–238 mμ, ε=21,300 and at 250 mμ, ε=16,850.

When operating in an analogous manner with optically-active Compound I, $Ac = C_6H_5CO$, the preparation of which is described in the copending, commonly assigned U.S. patent application Serial No. 36,172, filed June 15, 1960, now abandoned, Compound III, $Ac = C_6H_5CO$ was obtained having a melting point of 117° C. and a specific rotation $[\alpha]_D^{20} = +43°$ (c.=1% in methanol).

The preceding example is not to be construed as limiting the invention. Other equivalent techniques such as varying the reaction time, the reaction temperature, the isomerizing agent, the hydrolyzing agent, the solvents or the organic carboxylic acid ester (Ac can be propionyl, hexahydrobenzoyl or 3,5-dinitrobenzoyl, for example) may be used without departing from the spirit of the invention or the scope of the appended claims.

We claim:

1. $\Delta^{8(9)}$-3-methyl-7-oxo-8-(3'-chloro-2'-butenyl)-3,4-[3'-acyloxy-cyclopentano-(2',1')]-octahydronaphthalene compounds of the formula:

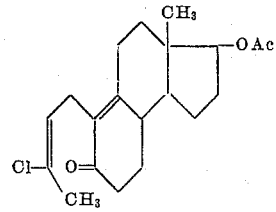

wherein Ac and acyl represent the acyl radical of a hydrocarbon carboxylic acid free of acetylenic unsaturation having from 1 to 18 carbon atoms.

2. $\Delta^{8(9)}$-3-methyl-7-oxo-8-(3'-chloro-2'-butenyl)-3,4-[3'-benzoyloxy-cyclopentano-(2',1')]-octahydronaphthalene.

3. The process of producing $\Delta^{8(9)}$-3-methyl-7-oxo-8-(3'-oxobutyl)-3,4-[3'-acyloxy-cyclopentano-(2',1')]-octahydronaphthalene compounds of the formula:

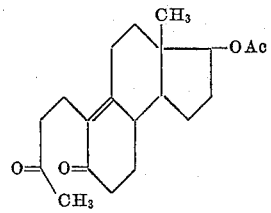

wherein Ac and acyl represent an acyl radical of a hydrocarbon carboxylic acid free of acetylenic unsaturation having from 1 to 18 carbon atoms, which comprises the steps of reacting $\Delta^{9(10)}$-3-methyl-7-oxo-8-(3'-chloro-2'-butenyl)-3,4-[3'-acyloxy-cyclopentano-(2',1')]-octahydronaphthalene compounds of the formula:

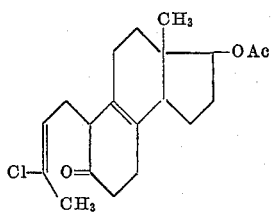

wherein Ac and acyl have the meaning defined above, in an inert organic solvent with an anhydrous, non-hydrolyzing acidic agent at about room temperature, wherein the double bond in the 9–10 position is isomerized into the 8–9 position, hydrolyzing the $\Delta^{8(9)}$-3-methyl-7-oxo-8-(3'-chloro-2'-butenyl)-3,4-[3'-acyloxy-cyclopentano-(2',1')[-octahydronaphthalene compounds of the structural formula:

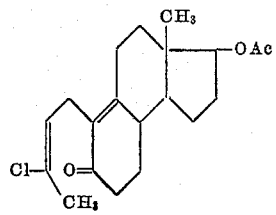

wherein Ac and acyl have the meaning defined above, in the presence of a concentrated aqueous solution of a strong mineral acid at about room temperature, and recovering said $\Delta^{8(9)}$-3-methyl-7-oxo-8-(3'-oxobutyl)-3,4-[3'-acyloxy-cyclopentano-2',1')]-octahydronaphthalene compounds.

4. The process of claim 3 wherein said anhydrous, nonhydrolyzing acidic agent is hydrochloric acid.

5. The process of claim 3 wherein said concentrated strong mineral acid is sulfuric acid.

6. The process of producing $\Delta^{8(9)}$-3-methyl-7-oxo-8-(3'-chloro-2'-butenyl)-3,4-[3'-acyloxy-cyclopentano-(2',1')[-octahydronaphthalene compounds of the formula:

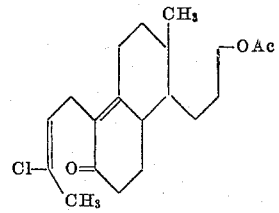

wherein Ac and acyl represent the acyl radical of a hydrocarbon carboxylic acid free of acetylenic unsaturation having from 1 to 18 carbon atoms, which comprises the steps of reacting $\Delta^{9(10)}$-3-methyl-7-oxo-8-(3'-chloro-2'-butenyl)-3,4-[3'-acyloxy-cyclopentano-(2',1')]-octahydronaphthalene compounds of the formula:

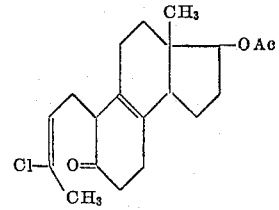

wherein Ac and acyl have the meaning defined above, in an inert organic solvent with an anhydrous, non-hydrolyzing acidic agent at about room temperature, wherein the double bond in the 9–10 position is isomerized into the 8–9 position, and recovering said $\Delta^{8(9)}$-3-methyl-7-oxo-8-(3'-chloro-2'-butenyl)-3,4-[3'-acyloxy-cyclopentano-(2',1')]-octahydronaphthalene compounds.

7. The process of claim 6 wherein said anhydrous, nonhydrolyzing acidic agent is hydrochloric acid.

8. The process of producing $\Delta^{8(9)}$-3-methyl-7-oxo-8-(3'-oxobutyl)-3,4-[3'-benzoyloxy-cyclopentano-(2',1')]-octahydronaphthalene, which comprises reacting $\Delta^{9(10)}$-3-methyl-7-oxo-8-(3'-chloro-2'-butenyl)-3,4-[3'-benzoyloxy-cyclopentano-(2',1')]-octahydronaphthalene with an ethereal solution of anhydrous hydrochloric acid at about room temperature, hydrolyzing the resulting $\Delta^{8(9)}$-3-methyl-7-oxo-8-(3'-chloro-2'-butenyl)-3,4-[3'-benzoyoloxy-cyclopentano-(2',1')]-octahydronaphthalene in the presence of concentrated aqueous sulfuric acid at about room temperature and recovering said $\Delta^{8(9)}$-3-methyl-7-oxo-8-(3'-oxobutyl)-3,4-[3'-benzoyloxy-cyclopentano-(2',1')]-octahydronaphthalene.

References Cited in the file of this patent
UNITED STATES PATENTS
2,793,233     Stork _____ May 21, 1957

OTHER REFERENCES
Julia: Bull. Soc. Chim., France (1954), pp. 785–6.